US012621759B2

(12) United States Patent
Liu

(10) Patent No.: US 12,621,759 B2
(45) Date of Patent: May 5, 2026

(54) CELL DETERMINATION METHOD AND CELL DETERMINATION APPARATUS

(71) Applicant: Beijing Xiaomi Mobile Software Co., Ltd., Beijing (CN)

(72) Inventor: Xiaofei Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 433 days.

(21) Appl. No.: 18/014,038

(22) PCT Filed: Aug. 6, 2020

(86) PCT No.: PCT/CN2020/107543
§ 371 (c)(1),
(2) Date: Dec. 30, 2022

(87) PCT Pub. No.: WO2022/027494
PCT Pub. Date: Feb. 10, 2022

(65) Prior Publication Data
US 2023/0300738 A1 Sep. 21, 2023

(51) Int. Cl.
*H04W 48/20* (2009.01)
*H04W 36/08* (2009.01)

(52) U.S. Cl.
CPC .......... *H04W 48/20* (2013.01); *H04W 36/08* (2013.01)

(58) Field of Classification Search
CPC ..... H04W 48/20; H04W 36/08; H04W 48/16; H04W 48/08; H04W 60/04; H04W 36/0055; H04W 48/18; H04W 36/0072; H04W 36/14; H04W 48/10

USPC .......................... 455/436–444; 370/329–331
See application file for complete search history.

(56) References Cited

U.S. PATENT DOCUMENTS

| | | | |
|---|---|---|---|
| 2019/0261264 A1 | 8/2019 | Lou et al. | |
| 2019/0268810 A1 | 8/2019 | Yin et al. | |
| 2019/0268840 A1* | 8/2019 | Chen ..................... | H04W 36/00 |
| 2020/0107378 A1 | 4/2020 | Velev et al. | |
| 2020/0245235 A1 | 7/2020 | Chun | |
| 2023/0037553 A1* | 2/2023 | Shih ..................... | H04W 36/13 |
| 2023/0156546 A1* | 5/2023 | Bergström ............ | H04W 36/08 |
| | | | 370/331 |

FOREIGN PATENT DOCUMENTS

| | | |
|---|---|---|
| CN | 108024314 A | 5/2018 |
| CN | 108347751 A | 7/2018 |
| CN | 109429277 A | 3/2019 |
| JP | 2020505890 A | 2/2020 |

(Continued)

OTHER PUBLICATIONS

Extended European Search Report Issued in Application No. 20948695.0 dated Apr. 17, 2024, 11 pages.

(Continued)

*Primary Examiner* — Michael Y Mapa
(74) *Attorney, Agent, or Firm* — Finnegan, Henderson, Farabow, Garrett & Dunner, L.L.P.

(57) ABSTRACT

A cell determination method is performed by a terminal, and includes: receiving slice-related information from a non-access stratum through an access stratum; and performing at least one of a cell selection or a cell reselection based on the slice-related information.

20 Claims, 7 Drawing Sheets

(56)         References Cited

FOREIGN PATENT DOCUMENTS

KR        20190076040  A       7/2019
WO     WO 2018199611  A1    11/2018

OTHER PUBLICATIONS

"Cell Reselection Based on Slice Information", Spreadtrum Communications, 3GPP TSG RAN WG2#99, R2-1709331, Berlin, Germany, Aug. 21-25, 2017, 3 pages.
"Idle mobility aspects to support network slicing", Samsun, 3GPP TSG-RAN WG2 NR #98 Meeting, R2-1704500, Hangzhou, China, May 15-19, 2017, 4 pages.
International Search Report and Written Opinion of International Application No. PCT/CN2020/107543, mailed Apr. 25, 2021, 13 pages.
Notice of the first review opinion for Japanese Application No. 2022-581686, dated Sep. 26, 2023.
Office Action for Russian Application No. 2023101173/07, issued on Sep. 11, 2023.
Request for the Submission of an Opinion for Korean Application No. 10-2023-7001047, dated May 26, 2025, 11 pages.

* cited by examiner

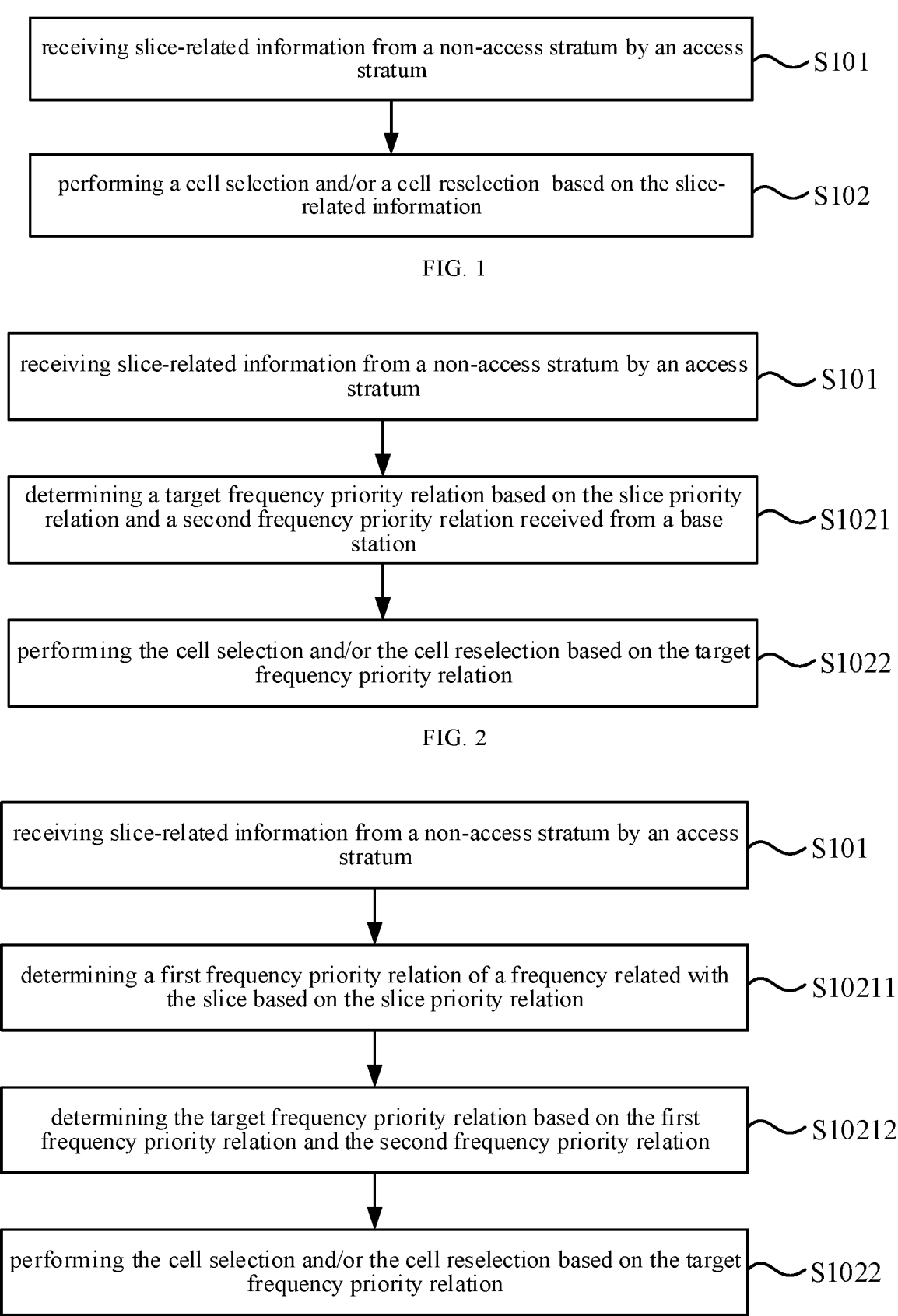

receiving slice-related information from a non-access stratum by an access stratum ~S101 performing a cell selection and/or a cell reselection based on the slice-related information ~S102

FIG. 1 receiving slice-related information from a non-access stratum by an access stratum ~S101 determining a target frequency priority relation based on the slice priority relation and a second frequency priority relation received from a base station ~S1021 performing the cell selection and/or the cell reselection based on the target frequency priority relation ~S1022

FIG. 2 receiving slice-related information from a non-access stratum by an access stratum ~S101 determining a first frequency priority relation of a frequency related with the slice based on the slice priority relation ~S10211 determining the target frequency priority relation based on the first frequency priority relation and the second frequency priority relation ~S10212 performing the cell selection and/or the cell reselection based on the target frequency priority relation ~S1022

FIG. 2A

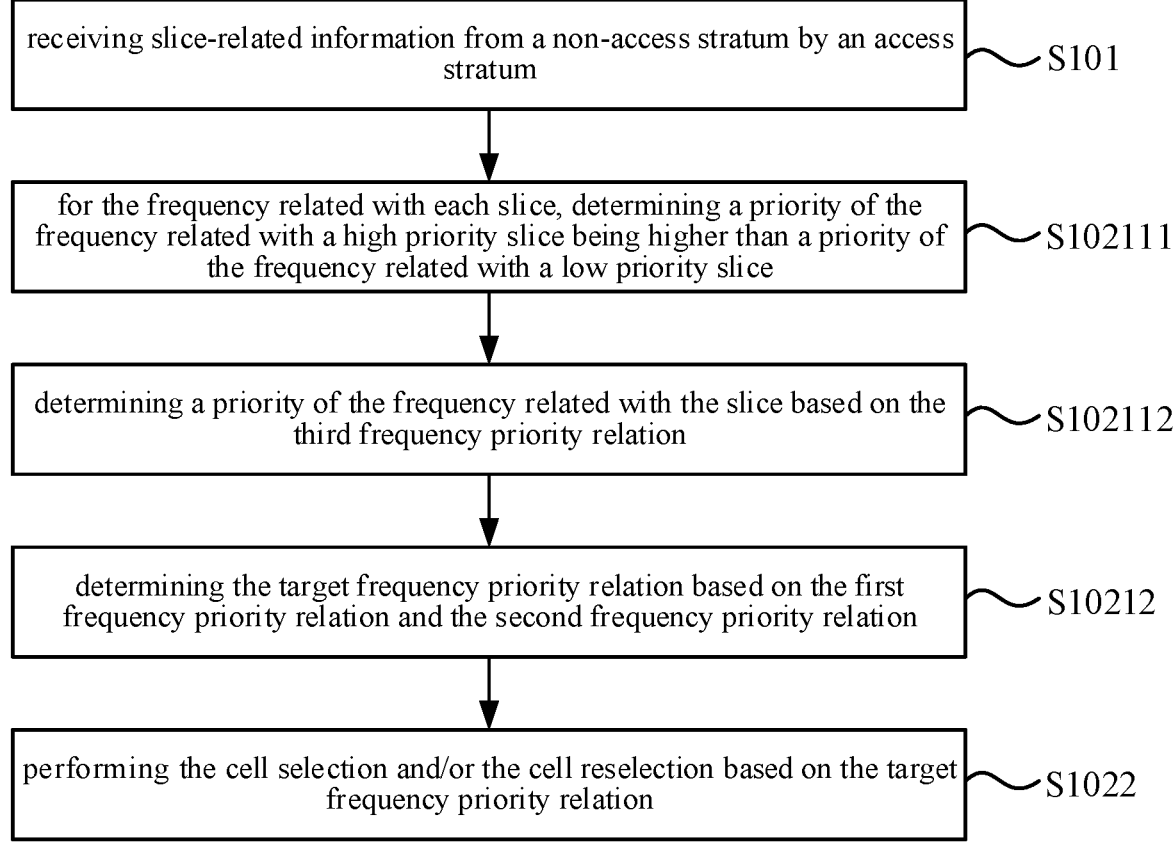

receiving slice-related information from a non-access stratum by an access stratum — S101 for the frequency related with each slice, determining a priority of the frequency related with a high priority slice being higher than a priority of the frequency related with a low priority slice — S102111 determining a priority of the frequency related with the slice based on the third frequency priority relation — S102112 determining the target frequency priority relation based on the first frequency priority relation and the second frequency priority relation — S10212 performing the cell selection and/or the cell reselection based on the target frequency priority relation — S1022

FIG. 3

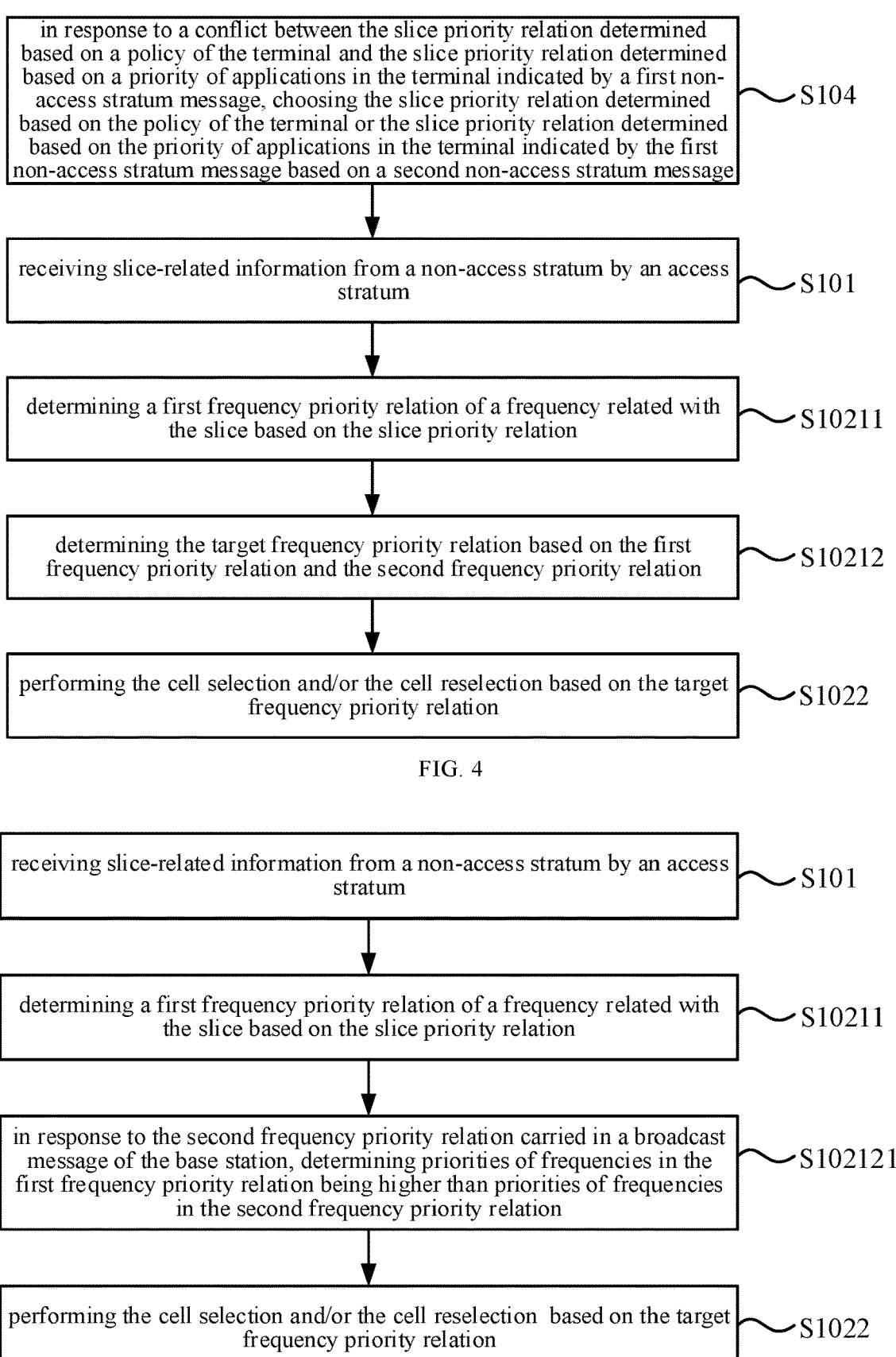

in response to a conflict between the slice priority relation determined based on a policy of the terminal and the slice priority relation determined based on a priority of applications in the terminal indicated by a first non-access stratum message, choosing the slice priority relation determined based on the policy of the terminal or the slice priority relation determined based on the priority of applications in the terminal indicated by the first non-access stratum message based on a second non-access stratum message ~S104 receiving slice-related information from a non-access stratum by an access stratum ~S101 determining a first frequency priority relation of a frequency related with the slice based on the slice priority relation ~S10211 determining the target frequency priority relation based on the first frequency priority relation and the second frequency priority relation ~S10212 performing the cell selection and/or the cell reselection based on the target frequency priority relation ~S1022

FIG. 4 receiving slice-related information from a non-access stratum by an access stratum ~S101 determining a first frequency priority relation of a frequency related with the slice based on the slice priority relation ~S10211 in response to the second frequency priority relation carried in a broadcast message of the base station, determining priorities of frequencies in the first frequency priority relation being higher than priorities of frequencies in the second frequency priority relation ~S102121 performing the cell selection and/or the cell reselection based on the target frequency priority relation ~S1022

FIG. 5

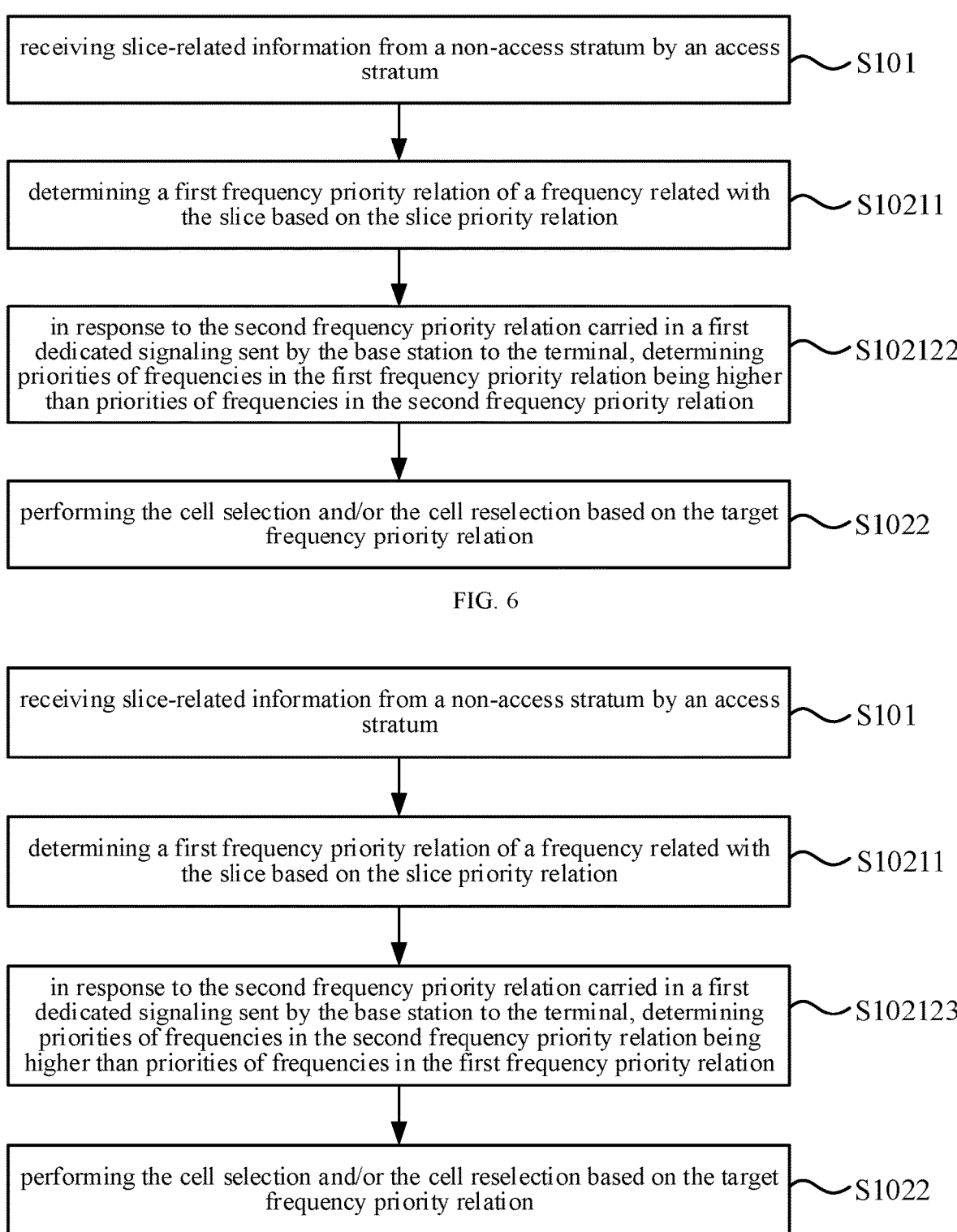

receiving slice-related information from a non-access stratum by an access stratum ~S101 determining a first frequency priority relation of a frequency related with the slice based on the slice priority relation ~S10211 in response to the second frequency priority relation carried in a first dedicated signaling sent by the base station to the terminal, determining priorities of frequencies in the first frequency priority relation being higher than priorities of frequencies in the second frequency priority relation ~S102122 performing the cell selection and/or the cell reselection based on the target frequency priority relation ~S1022

FIG. 6 receiving slice-related information from a non-access stratum by an access stratum ~S101 determining a first frequency priority relation of a frequency related with the slice based on the slice priority relation ~S10211 in response to the second frequency priority relation carried in a first dedicated signaling sent by the base station to the terminal, determining priorities of frequencies in the second frequency priority relation being higher than priorities of frequencies in the first frequency priority relation ~S102123 performing the cell selection and/or the cell reselection based on the target frequency priority relation ~S1022

FIG. 7

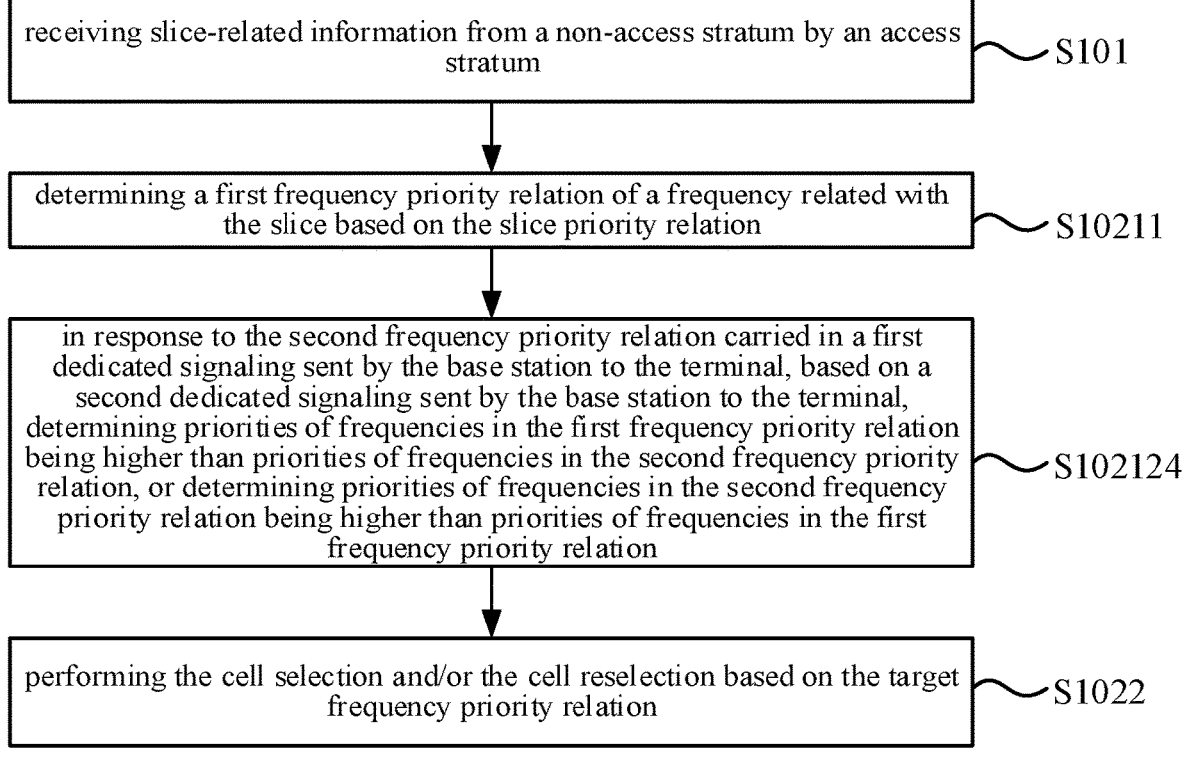

receiving slice-related information from a non-access stratum by an access stratum   ∼S101 determining a first frequency priority relation of a frequency related with the slice based on the slice priority relation   ∼S10211 in response to the second frequency priority relation carried in a first dedicated signaling sent by the base station to the terminal, based on a second dedicated signaling sent by the base station to the terminal, determining priorities of frequencies in the first frequency priority relation being higher than priorities of frequencies in the second frequency priority relation, or determining priorities of frequencies in the second frequency priority relation being higher than priorities of frequencies in the first frequency priority relation   ∼S102124 performing the cell selection and/or the cell reselection based on the target frequency priority relation   ∼S1022

FIG. 8

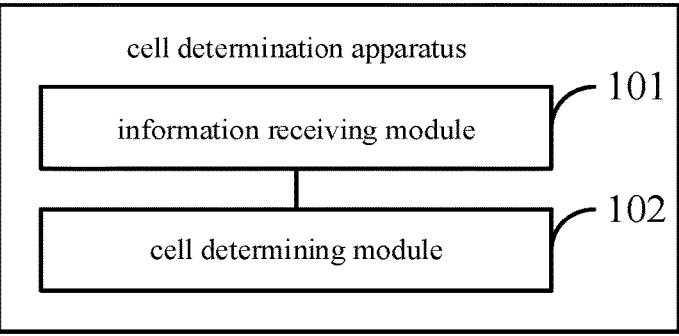

cell determination apparatus information receiving module   ⌐ 101 cell determining module   ⌐ 102

FIG. 9

CELL DETERMINATION METHOD AND CELL DETERMINATION APPARATUS

CROSS-REFERENCE TO RELATED APPLICATION

This application is a U.S. national phase of International Application No. PCT/CN2020/107543, filed Aug. 6, 2020, the entire content of which is incorporated herein by reference.

TECHNICAL FIELD

The disclosure relates to the field of communication technologies, and provides a cell determination method, a cell determination apparatus, an electronic device and a computer-readable storage medium.

BACKGROUND

When a terminal selects or reselects a cell, a cell to be accessed is determined based on the frequency priorities. For example, a base station can send the frequency priorities to the terminal via a broadcast message or configure the frequency priorities for the terminal via a dedicated signaling, so that the terminal may determine the frequencies of multiple cells and select a suitable cell with a higher priority frequency to access.

Generally, the cell is selected or reselected based on the frequency priorities broadcasted or configured by the base station, which may not take actual situation of the terminal into consideration, thereby making selecting or reselecting a cell unreasonable.

SUMMARY

The disclosure provide a cell determination method, a cell determination apparatus, an electronic device and a non-transitory computer-readable storage medium.

According to a first aspect of the disclosure, a cell determination method, performed by a terminal, is provided. The method includes:

receiving slice-related information from a non-access stratum by an access stratum; and performing a cell selection and/or a cell reselection based on the slice-related information.

According to a second aspect of the disclosure, an electronic device is provided. The electronic device includes:

a processor;

a memory for storing instructions executable by the processor; in which the processor is configured to implement the above cell determination method.

According to a third aspect of the disclosure, a non-transitory computer readable storage medium storing computer programs is provided. When the computer programs are executed by a processor, the above cell determination method is implemented.

BRIEF DESCRIPTION OF THE DRAWINGS

In order to clearly illustrate the technical solution of the embodiments of the disclosure, a brief description of drawings used in the embodiments is given below. Obviously, the drawings in the following descriptions are only part of the embodiments of the disclosure, and for those skilled in the art, other drawings can be obtained according to these drawings without inventive works.

FIG. 1 is a flowchart of a cell determination method according to the embodiment of the disclosure.

FIG. 2 is a flowchart of a cell determination method according to the embodiment of the disclosure.

FIG. 2A is a flowchart of a cell determination method according to the embodiment of the disclosure.

FIG. 3 is a flowchart of a cell determination method according to the embodiment of the disclosure.

FIG. 4 is a flowchart of a cell determination method according to the embodiment of the disclosure.

FIG. 5 is a flowchart of a cell determination method according to the embodiment of the disclosure.

FIG. 6 is a flowchart of a cell determination method according to the embodiment of the disclosure.

FIG. 7 is a flowchart of a cell determination method according to the embodiment of the disclosure.

FIG. 8 is a flowchart of a cell determination method according to the embodiment of the disclosure.

FIG. 9 is a block diagram of a cell determination apparatus according to the embodiment of the disclosure.

DETAILED DESCRIPTION

Figure 10:
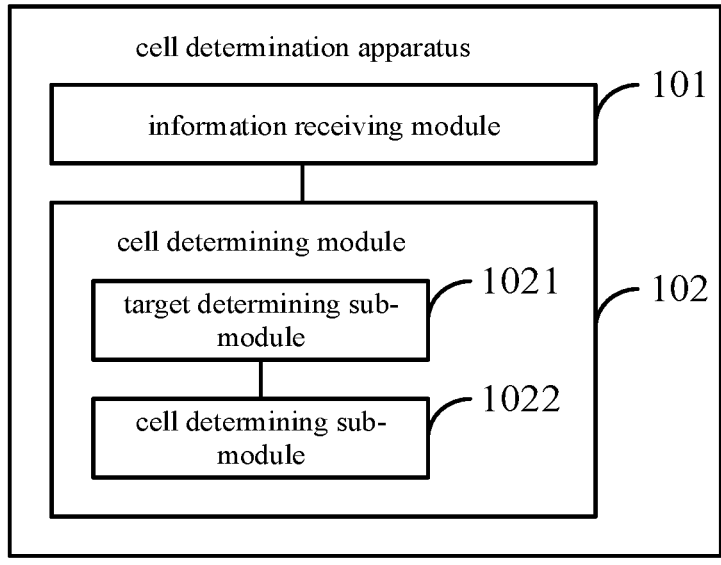
FIG. 10 is a block diagram of a cell determination apparatus according to the embodiment of the disclosure.

Reference will be made clearly and completely in the technical solution of the embodiments of the disclosure with the accompanying drawings. Obviously, the embodiments described here are only part of the embodiments of the disclosure and are not all embodiments of the disclosure. Based on the embodiments of the disclosure, other embodiments obtained by those skilled in the art without inventive works are within the scope of the disclosure.

FIG. 1 is a flowchart of a cell determination method according to the embodiment of the disclosure. The method shown in this embodiment may be applicable to a terminal, which includes, but is not limited to, a cell phone, a tablet computer, a wearable device, a sensor, an Internet of Things (IoT) device and other electronic devices. The terminal may communicate with a base station as a user equipment, and the base station includes but is not limited to a 4G base station, a 5G base station, and a 6G base station.

As shown in FIG. 1, the cell determination method includes the following steps.

At step S101, slice-related information from a non-access stratum is received by an access stratum.

At step S102, a cell selection and/or a cell reselection is performed based on the slice-related information.

In an embodiment, the terminal may provide the slice-related information from the Non-Access Stratum (NAS) to the Access Stratum (AS). The slice includes a network slice, and the slice-related information includes, but is not limited to, Network Slice Selection Assistance Information (NS-SAI), a priority of the slice, and priorities of frequencies corresponding to the slice. The terminal selects and/or reselects the cell based on the slice-related information.

The terminal provides the slice-related information from the NAS to the AS, which is not limited to the network side to a certain extent, and the terminal determines the slice-related information at the NAS according to its own situation and receives the slice-related information by the AS from the NAS, and thus the cell can be selected or reselected based on the slice-related information, which makes the cell selection result or the cell reselection result more conform to the terminal's own situation.

Optionally, the slice-related information includes requested NSSAI and/or allowed NSSAI.

In an embodiment, if the slice-related information includes the NSSAI, the NSSAI may include the requested NSSAI or the allowed NSSAI, or the NSSAI may include both the requested NSSAI and the allowed NSSAI.

Optionally, the requested NSSAI and/or the allowed NSSAI is provided to the AS by the NAS when the terminal sends an initial NAS message.

In an embodiment, the requested NSSAI is the requested NSSAI provided by the NAS to the AS when the terminal sends the initial NAS message while the NAS is not connected (i.e., the NAS is in a Connection Management IDLE (CM-IDLE) state). The allowed NSSAI is the allowed NSSAI provided by the NAS to the AS when the terminal sends the initial NAS message while the NAS is not connected.

Optionally, the requested NSSAI and/or the allowed NSSAI is provided to the AS by the NAS when the terminal sends a NAS message to update registered slices.

In an embodiment, the requested NSSAI may be the requested NSSAI provided by the NAS to the AS when the terminal sends a NAS message to update the registered slices while the NAS is connected (i.e., the NAS is in the CM-CONNECTED state). The allowed NSSAI may be the allowed NSSAI provided by the NAS to the AS when the terminal sends a NAS message to update the registered slices while the NAS is connected.

In the related art, when the NAS is connected, if the terminal updates the registered slices to the network side (e.g., the core network), the NAS does not provide the updated requested NSSAI to the AS. In this case, the slice-related information configured for performing a cell selection and/or a cell reselection according to the embodiment shown in FIG. 1 of the disclosure is the slice-related information before the update, which is not conform to the latest status of the terminal.

In the embodiment, if the NAS is connected, when the terminal sends the updated registered slices to the network side, the NAS may provide the updated requested NSSAI and/or allowed NSSAI as the slice-related information to the AS, and thus the slice-related information conforms to the latest state of the terminal, and the cell selection result and/or the cell reselection result obtained based on the slice-related information conforms to the latest state of the terminal.

Optionally, the slice-related information includes preconfigured NSSAI provided to the AS by the NAS of the terminal when selecting a Public Land Mobile Network (PLMN).

FIG. 2 is a flowchart of a cell determination method according to the embodiment of the disclosure. As shown in FIG. 2, the slice-related information includes a slice priority relation, and performing the cell selection and/or the cell reselection based on the slice-related information includes the following steps.

At step S1021, a target frequency priority relation is determined based on the slice priority relation and a second frequency priority relation received from a base station.

At step S1022, the cell selection and/or the cell reselection is performed based on the target frequency priority relation.

FIG. 2A is a flowchart of a cell determination method according to the embodiment of the disclosure. As shown in FIG. 2A, determining the target frequency priority relation based on the slice priority relation and the second frequency priority relation received from the base station includes the following steps.

At step S10211, a first frequency priority relation of a frequency related with the slice is determined based on the slice priority relation.

At step S10212, the target frequency priority relation is determined based on the first frequency priority relation and the second frequency priority relation.

In an embodiment, the slice-related information may include the slice priority relation. For example, the slices include slice 1 and slice 2, and the slice priority relation may be that the priority of slice 1 is higher than the priority of slice 2.

In an embodiment, the target frequency priority relation is determined based on the slice priority relation and the second frequency priority relation received from the base station. For example, when the base station sends multiple second frequency priority relations to the terminal, and the second frequency priority relations are associated with multiple slices, then the second frequency priority relation corresponding to the slice with the highest priority is determined as the target frequency priority relation.

In addition to the above mode, the target frequency priority relation may be determined according to the following mode.

In an embodiment, the first frequency priority relation of the frequency related with the slice is determined based on the slice priority relation. For example, the frequencies associated with slice 1 are f1 and f2 and the frequencies associated with slice 2 are f3 and f4, then the priority of frequencies f1 and f2 may be determined to be higher than the priority of frequencies f3 and f4.

In addition, the base station sends the second frequency priority relation to the terminal. For example, the base station may send the second frequency priority relation to the terminal by broadcasting or by a dedicated signaling.

In the related art, when selecting a cell based on frequency priorities, selecting a cell and/or reselecting a cell is performed only based on a frequency priority relation sent from a base station to a terminal. However, according to this embodiment, after determining the first frequency priority relation of the frequency associated with the slice based on the slice priority relation, the terminal determines the target frequency priority relation based on the first frequency priority relation and the second frequency priority relation received from the base station, and then selects the cell and/or reselects the cell based on the target frequency priority relation.

Since the first frequency priority relation is determined based on the slice priorities, and the slice priorities belong to the slice-related information, the terminal may provide the slice-related information from the NAS to the AS, in which the slice-related information is determined by the terminal according to its own situation. Further, selecting the cell and/or re-selecting the cell is performed based on the target frequency priority relation, which makes the cell selection result or the cell reselection result more conform to the terminal's own situation.

FIG. 3 is a flowchart of a cell determination method according to the embodiment of the disclosure. As shown in FIG. 3, the method further includes the following steps.

At step S103, a third frequency priority relation of a frequency related with each slice is determined.

Determining the first frequency priority relation based on the slice priority relation includes the following steps.

At step S102111, for the frequency related with each slice, a priority of the frequency related with a high priority slice is determined to be higher than a priority of the frequency related with a low priority slice.

At step S102112, a priority of the frequency related with the slice is determined based on the third frequency priority relation.

In an embodiment, each slice may be associated with multiple frequencies. For example, slice 1 is associated with frequencies f1 and f3, and slice 2 is associated with frequencies f2 and f3. The network side may set a frequency priority relation, hereinafter referred to as the third frequency priority relation, for the frequencies associated with the slice. For example, the third frequency priority relation for frequencies f1 and f3 associated with slice 1 is that the priority of f1 is higher than the priority of f3, and the third frequency priority relation for frequencies f2 and f3 associated with slice 2 is that the priority of f2 is higher than the priority of f3.

On the basis, for the frequencies associated with different slices, the priority of the frequency related with the high priority slice is higher than the priority of the frequency related with the low priority slice. For example, for slices 1 and 2 above, the priority of f1 associated with slice 1 is higher than the priority of f2 and the priority of f3 associated with slice 2, and the priority of f3 associated with slice 1 is higher than the priority of f2 and the priority of f3 associated with slice 2.

Since the priority of the frequency associated with a slice will not be higher than the priority of the frequency itself, the above case where the priority of f3 associated with slice 1 is higher than the priority of f3 associated with slice 2 may be deleted, and then in the above case, the priority of f1 is higher than the priority of f2 and f3, and the priority of f3 is higher than the priority of f2.

Moreover, f1 and f3 are the frequencies associated with the same slice, i.e., slice 1, and the priority of f1 and the priority of f3 are determined based on the third frequency priority relation corresponding to slice 1, i.e., the priority of f1 is higher than the priority of f3.

Since the priority of f1 is higher than the priority of f2 and the priority of f3, the priority of f3 is higher than the priority of f2, and the priority of f1 is higher than the priority of f3, then it is determined that the priority relation of the three frequencies f1, f2 and f3 is f1>f3>f2.

Optionally, the slice priority relation is determined according to the policy of the terminal and/or according to the priority of applications in the terminal indicated by a first NAS message.

In an embodiment, the slice priority relation may be determined based on the policy of the terminal or may be determined based on the priority of applications in the terminal indicated by the first NAS message.

The policy of the terminal can be set by the terminal itself. For example, the policy can be set by a manufacturer of the terminal or by the user of the terminal, and the policy of the terminal belongs to the information from the NAS.

The first NAS message may be, for example, UE Route Selection Policy (URSP) Rule(s), and the URSP Rule(s) may correspond to the applications in the terminal. The network side may determine the priority of the URSP Rule(s), and then determine the priorities of the applications based on the priority of the URSP Rule(s).

FIG. 4 is a flowchart of a cell determination method according to the embodiment of the disclosure. As shown in FIG. 4, the method further includes the following steps.

At step S104, in response to a conflict between the slice priority relation determined based on a policy of the terminal and the slice priority relation determined based on a priority of applications in the terminal indicated by a first NAS message, the terminal chooses either the slice priority relation determined based on the policy of the terminal or the slice priority relation determined based on the priority of applications in the terminal indicated by the first NAS message based on a second NAS message.

In an embodiment, for the conflict between the slice priority relation determined based on the policy of the terminal and the slice priority relation determined based on the priority of applications in the terminal indicated by the first NAS message, the example of conflict may be that the slice priority relation determined according to the policy of the terminal is that the priority of slice 1 is higher than the priority of slice 2, while the slice priority relation determined according to the priority of applications in the terminal indicated by the first NAS message is that the priority of slice 2 is higher than the priority of slice 1.

Afterwards, the second NAS message is sent to the terminal, or the second NAS message and the first NAS message are the same message, and the second NAS message may indicate which priority relation to choose in case of conflict between the slice priority relations as described above. Therefore, the terminal may choose either the slice priority relation determined based on the policy of the terminal or the slice priority relation determined based on the priority of applications in the terminal indicated by the first NAS message based on the second NAS message.

FIG. 5 is a flowchart of a cell determination method according to the embodiment of the disclosure. As shown in FIG. 5, determining the target frequency priority relation based on the first frequency priority relation and the second frequency priority relation includes the following steps.

At step S102121, in response to the second frequency priority relation carried in a broadcast message of the base station, priorities of frequencies in the first frequency priority relation are determined to be higher than priorities of frequencies in the second frequency priority relation.

In an embodiment, when the second frequency priority relation is sent via the broadcast message by the base station to the terminal, the broadcast message is not sent in a targeted manner, i.e., the broadcast message is not necessarily targeted for the terminal. In this case, generally, the first frequency priority relation determined based on the slice priority relation is more conform to the current situation of the terminal than the second frequency priority relation. Therefore, the priorities of the frequencies in the first frequency priority relation are determined to be higher than the priorities of the frequencies in the second frequency priority relation.

FIG. 6 is a flowchart of a cell determination method according to the embodiment of the disclosure. As shown in FIG. 6, determining the target frequency priority relation based on the first frequency priority relation and the second frequency priority relation includes the following steps.

At step S102122, in response to the second frequency priority relation carried in a first dedicated signaling sent by the base station to the terminal, priorities of frequencies in the first frequency priority relation are determined to be higher than priorities of frequencies in the second frequency priority relation.

In an embodiment, when the base station sends the first dedicated signaling carrying the second frequency priority relation to the terminal, since the first dedicated signaling is sent by the base station to the terminal, the base station may not be aware of the current situation of the terminal. In this case, the first frequency priority relation determined based on the slice priority relation is generally more conform to the current situation of the terminal rather than the second frequency priority relation, so that the priorities of the frequencies in the first frequency priority relation are determined to be higher than the priorities of the frequencies in the second frequency priority relation.

Optionally, determining the priorities of the frequencies in the first frequency priority relation being higher than the priorities of the frequencies in the second frequency priority relation includes:

determining overlap frequencies between the frequencies in the first frequency priority relation and the frequencies in the second frequency priority relation; and determining priorities of the overlap frequencies based on the first frequency priority relation, and determining the priorities of the overlap frequencies being higher than the priorities of other frequencies in the second frequency priority relation.

In an embodiment, since the frequencies corresponding to the second frequency priority relation sent by the base station to the terminal are generally the frequencies of cells adjacent to the cell where the base station is located, i.e., the frequencies to be determined by the terminal after receiving the second frequency priority relation, not all the frequencies corresponding to the first frequency priority relation determined by the terminal based on the slice-related information need to be determined.

For the frequencies need to be determined by the terminal, after the terminal determines the priorities of the frequencies, it preferentially selects cells with high priority frequencies according to the priorities of the frequencies in a descending order, and then selects the cell with the highest signal quality from the cells with the high priority frequencies.

For example, the first frequency priority relation corresponds to frequencies f1, f2, f3, f4 and f5, and the priorities of the frequencies in the first frequency priority relation is f4>f2>f1>f3>f5, and the second frequency priority relation corresponds to frequencies f1, f2 and f3, and the priorities of the frequencies in the second frequency priority relation is f1>f3>f2. Generally, f1, f2 and f3 are the frequencies to be determined by the terminal, and f4 and f5 are not the frequencies needing to be determined by the terminal. That is, the terminal needs to consider each frequency in the second frequency priority relation, but not necessarily each frequency in the first frequency priority relation, when the frequencies (e.g., the frequencies of the cells) are needed to be determined for selecting or reselecting the cell.

The terminal determines the overlap frequencies between the frequencies in the first frequency priority relation and the frequencies in the second frequency priority relation. For example, the above f1, f2 and f3 are the overlap frequencies. It is determined that the priorities of the overlap frequencies are higher than the priorities of other frequencies in the second frequency priority relation, and the other frequencies refer to the frequencies other than the overlap frequencies in the second frequency priority relation. Since there are no other frequencies in the above case, only the priorities of f1, f2 and f3 need to be determined, and then the determined relation is f1>f3>f2 with no need to consider the priorities of f4 and f5, so that there may be less priorities of the frequencies needing to be determined by the terminal.

For example, the first frequency priority relation corresponds to frequencies f1, f2 and f3, and the first frequency priority relation is f1>f3>f2; the second frequency priority relation corresponds to frequencies f1, f2, f3, f4 and f5, and the second frequency priority relation is f4>f2>f1>f3>f5. Generally, the priorities of the frequencies f1, f2, f3, f4 and f5 need to be determined by the terminal.

Moreover, f1, f2 and f3 are the overlap frequencies and the other frequencies are f4 and f5, that is, the priorities of f1, f2 and f3 are higher than the priorities of f4 and f5, in which the priorities of f1, f2 and f3 are determined based on the first frequency priority relation, i.e., f1>f3>f2. Since the other frequencies only belong to the second frequency priority relation, the priorities of the other frequencies are determined according to the second frequency priority relation, i.e., f4>f5, and then the final determined relation is f1>f3>f2>f4>f5, so that the priorities of the frequencies needing to be determined may be guaranteed to be determined.

FIG. 7 is a flowchart of a cell determination method according to the embodiment of the disclosure. As shown in FIG. 7, determining the target frequency priority relation based on the first frequency priority relation and the second frequency priority relation includes the following steps.

At step S102123, in response to the second frequency priority relation carried in a first dedicated signaling sent by the base station to the terminal, priorities of frequencies in the second frequency priority relation are determined to be higher than priorities of frequencies in the first frequency priority relation.

In an embodiment, when the base station sends the first dedicated signaling carrying the second frequency priority relation to the terminal, since the first dedicated signaling is sent by the base station to the terminal and is more conform to the needs of the base station, the priorities of the frequencies in the second frequency priority relation are determined to be higher than the priorities of the frequencies in the first frequency priority relation.

FIG. 8 is a flowchart of a cell determination method according to the embodiment of the disclosure. As shown in FIG. 8, determining the target frequency priority relation based on the first frequency priority relation and the second frequency priority relation includes the following steps.

At step S102214, in response to the second frequency priority relation carried in a first dedicated signaling sent by the base station to the terminal, based on a second dedicated signaling sent by the base station to the terminal, priorities of frequencies in the first frequency priority relation are determined to be higher than priorities of frequencies in the second frequency priority relation, or priorities of frequencies in the second frequency priority relation are determined to be higher than priorities of frequencies in the first frequency priority relation.

In an embodiment, when the second frequency priority relation is carried in the first dedicated signaling sent from the base station to the terminal, whether the priorities of the frequencies in the first frequency priority relation are higher than the priorities of the frequencies in the second frequency priority relation or the priorities of the frequencies in the second frequency priority relation are higher than the priorities of the frequencies in the first frequency priority relation is determined by the terminal based on the second dedicated signaling sent from the base station. The second dedicated signaling and the above-mentioned first dedicated signaling may be the same or different.

Corresponding to the embodiments of the cell determination method, the disclosure also provides the embodiments of a cell determination apparatus.

FIG. 9 is a block diagram of a cell determination apparatus according to the embodiment of the disclosure. The apparatus shown in the embodiment may be applicable to a terminal, which includes, but is not limited to, a cell phone, a tablet computer, a wearable device, a sensor, an IoT device, and other electronic devices. The terminal may communicate with the base station as a user equipment. The base station includes but is not limited to a 4G base station, a 5G base station and a 6G base station.

As shown in FIG. 9, the cell determination apparatus includes: an information receiving module 101 and a cell determining module 102.

The information receiving module 101 is configured to receive by an AS slice-related information from a NAS.

The cell determining module 102 is configured to perform a cell selection and/or a cell reselection based on the slice-related information.

Optionally, the slice-related information includes the requested NSSAI and/or the allowed NSSAI.

Optionally, the requested NSSAI and/or the allowed NSSAI is provided to the AS by the NAS in response to the terminal sending the initial NAS message.

Optionally, the requested NSSAI and/or the allowed NSSAI is provided to the AS by the NAS in response to the terminal sending the NAS message to update the registered slices.

Optionally, the slice-related information includes the pre-configured NSSAI provided by the NAS to the AS in response to selecting the PLMN.

FIG. 10 is a block diagram of another cell determination apparatus according to the embodiment of the disclosure. As shown in FIG. 10, the slice-related information includes a slice priority relation. The cell determining module 102 includes: a target determining sub-module 1021 and a cell determining sub-module 1022.

The target determining sub-module 1021 is configured to determine a target frequency priority relation based on the slice priority relation and a second frequency priority relation received from a base station.

The cell determining sub-module 1022 is configured to perform the cell selection and/or the cell reselection based on the target frequency priority relation.

Optionally, the target determining sub-module is configured to: determine a first frequency priority relation of a frequency related with the slice based on the slice priority relation, and determine the target frequency priority relation based on the first frequency priority relation and the second frequency priority relation.

Figure 11:
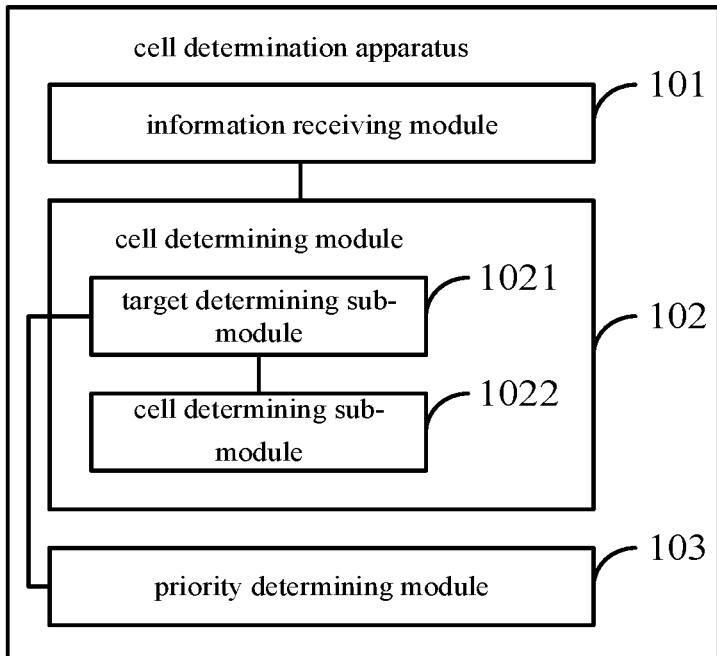
FIG. 11 is a block diagram of a cell determination apparatus according to the embodiment of the disclosure.

FIG. 11 is a block diagram of yet another cell determination apparatus according to the embodiment of the disclosure. As shown in FIG. 11, the apparatus includes: a priority determining module 103.

The priority determining module 103 is configured to determine a third frequency priority relation of a frequency related with each slice.

The target determining sub-module 1021 is configured to: for the frequency related with each slice, determine a priority of the frequency related with a high priority slice being higher than a priority of the frequency related with a low priority slice, and determine a priority of the frequency related with the slice based on the third frequency priority relation.

Optionally, the slice priority relation is determined based on a policy of the terminal and/or based on a priority of applications in the terminal indicated by a first NAS message.

Figure 12:
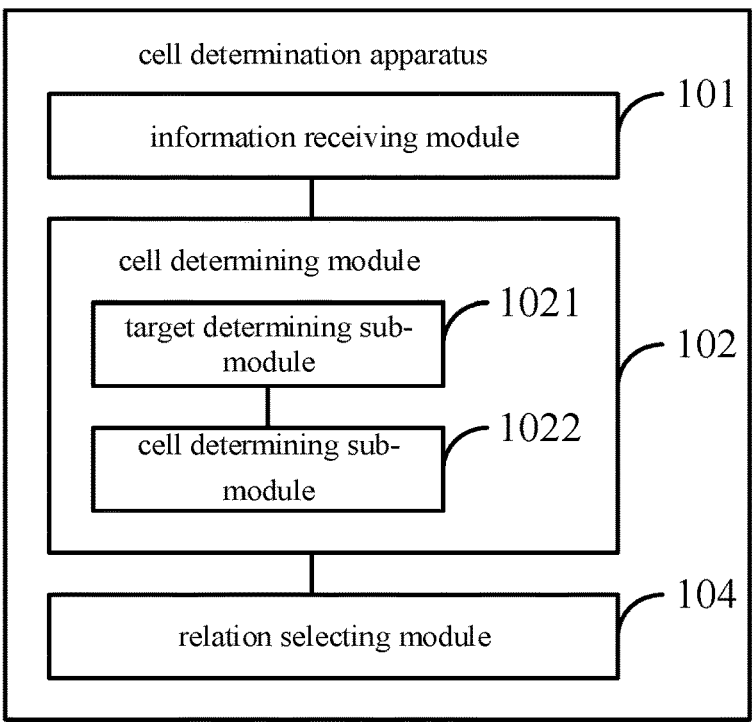
FIG. 12 is a block diagram of a cell determination apparatus according to the embodiment of the disclosure.

FIG. 12 is a block diagram of a further cell determination apparatus according to the embodiment of the disclosure. As shown in FIG. 12, the apparatus includes: a relation selecting module 104.

The relation selecting module 104 is configured to: in response to a conflict between the slice priority relation determined based on a policy of the terminal and the slice priority relation determined based on a priority of applications in the terminal indicated by a first NAS message, choose the slice priority relation determined based on the policy of the terminal or the slice priority relation determined based on the priority of applications in the terminal indicated by the first NAS message based on a second NAS message.

Optionally, the priority determining sub-module is configured to: in response to the second frequency priority relation carried in a broadcast message of the base station, determine priorities of frequencies in the first frequency priority relation being higher than priorities of frequencies in the second frequency priority relation.

Optionally, the priority determining sub-module is configured to: in response to the second frequency priority relation carried in a first dedicated signaling sent by the base station to the terminal, determine priorities of frequencies in the first frequency priority relation being higher than priorities of frequencies in the second frequency priority relation.

Optionally, the priority determining sub-module is configured to: determine overlap frequencies between the frequencies in the first frequency priority relation and the frequencies in the second frequency priority relation; determine priorities of the overlap frequencies based on the first frequency priority relation; and determine the priorities of the overlap frequencies being higher than the priorities of other frequencies in the second frequency priority relation.

Optionally, the priority determining sub-module is configured to: in response to the second frequency priority relation carried in a first dedicated signaling sent by the base station to the terminal, determine priorities of frequencies in the second frequency priority relation being higher than priorities of frequencies in the first frequency priority relation.

Optionally, the priority determining sub-module is configured to: in response to the second frequency priority relation carried in a first dedicated signaling sent by the base station to the terminal, determine priorities of frequencies in the first frequency priority relation being higher than priorities of frequencies in the second frequency priority relation, or determine priorities of frequencies in the second frequency priority relation being higher than priorities of frequencies in the first frequency priority relation based on a second dedicated signaling sent by the base station to the terminal.

With respect to the apparatus in the above embodiments, the specific manner in which each module performs its operation has been described in detail in the embodiments of the relevant method, and will not be described in detail here.

The apparatus embodiments basically correspond to the method embodiments, the related contents can refer to part of the descriptions of the method embodiments. The above-described apparatus embodiments are merely schematic, the units described above as separate components may or may not be physically separated, and the components displayed as units may or may not be physical units, i.e., the components may be located in one area or may be distributed to multiple network units. Some or all of these modules can be selected according to practical needs to achieve the purpose of the solution of the disclosure. Those skilled in the art can understand and implement the solution without inventive works.

The embodiment of the disclosure provides an electronic device. The electronic device includes:

a processor;

a memory for storing instructions executable by the processor; in which the processor is configured to implement the cell determination method of any of the above embodiments.

The embodiment of the disclosure also provides a computer readable storage medium having computer programs stored thereon. When the computer programs are executed by a processor, the cell determination method described in any of the above embodiments is implemented.

Figure 13:
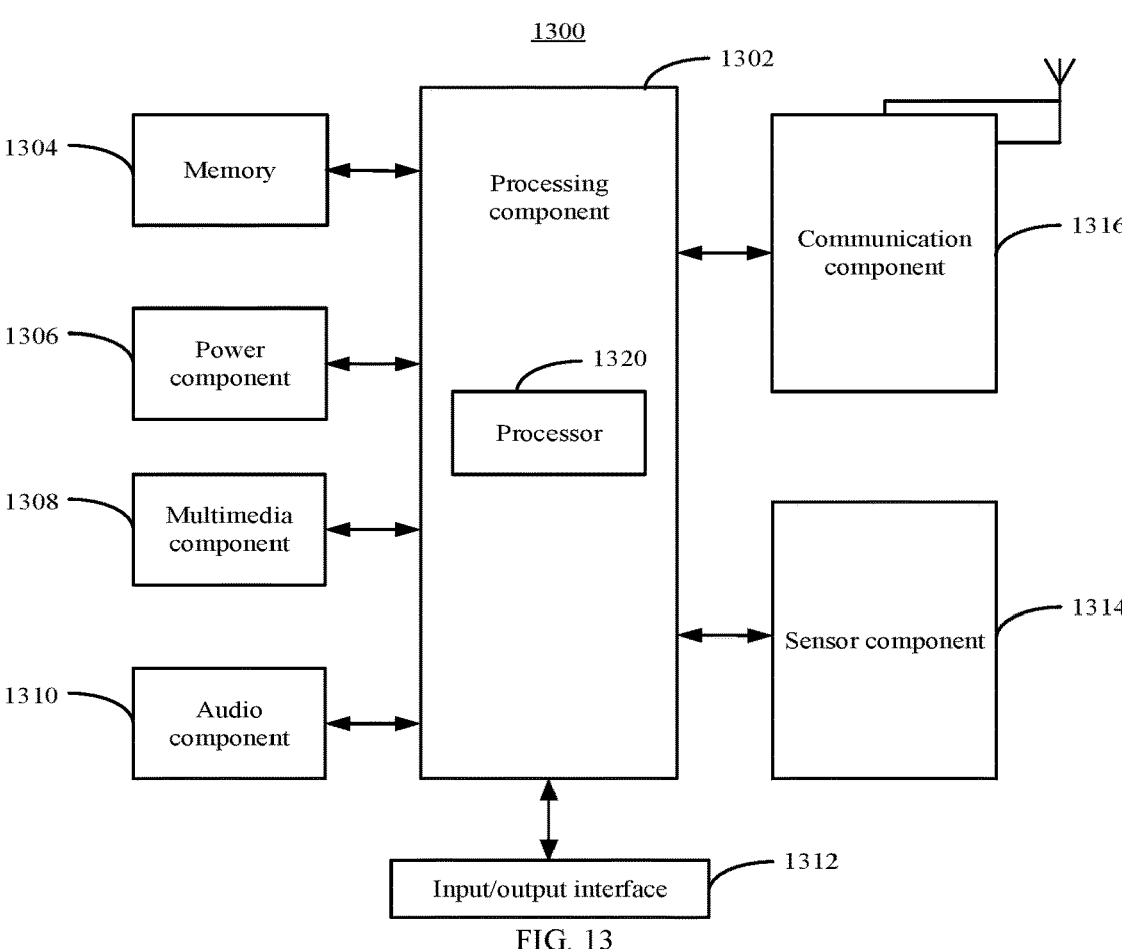
FIG. 13 is a block diagram of a device for determining a cell according to the embodiment of the disclosure.

FIG. 13 is a block diagram of a device 1300 for determining a cell according to an exemplary embodiment. For example, the device 1300 may be a mobile phone, a computer, a digital broadcasting terminal, a message transceiver device, a game console, a tablet device, a medical device, a fitness device and a personal digital assistant.

As illustrated in FIG. 13, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to perform all or part of the steps in the above described method. Moreover, the processing component 1302 may include one or more modules which facilitate the interaction between the processing component 1302 and other components. For example, the processing component 1302 may include a multimedia module to facilitate the interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front-facing camera and/or a rear-facing camera. When the device 1300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1310 is configured to output and/or input audio signals. For example, the audio component 1310 includes a microphone (MIC) configured to receive an external audio signal when the device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a Complementary Metal Oxide Semiconductor (CMOS) or Charge-Coupled Device (CCD) image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as Wi-Fi, 2G or 3G, 4G LTE, 5G NR or a combination thereof. In an exemplary embodiment, the communication component 1316 receives a broadcast signal or broadcast associated information from an external broadcast management system via a broadcast channel. In an exemplary embodiment, the communication component 1316 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 1300 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In the exemplary embodiments, there is also provided a non-transitory computer readable storage medium including executable instructions, such as the memory 1304, executable by the processor 1320 in the device 1300, for performing the above method. For example, the non-transitory computer-readable storage medium may be a ROM, a Random Access Memory (RAM), a CD-ROM, a magnetic tape, a floppy disc, and an optical data storage device.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

The method and apparatus provided by the embodiments of the disclosure are described in detail above, and specific examples are applied in the disclosure to illustrate the principles and implementation of the disclosure. The above description of the embodiments is intended only to assist in understanding the method of the disclosure and its core ideas. Meanwhile, those skilled in the art may make changes in the specific implementation and the scope of application based on the ideas of this disclosure. In conclusion, the contents of the disclosure should not be considered as limiting the disclosure.

What is claimed is:

1. A cell determination method, performed by a terminal, comprising:

performing at least one of a cell selection or a cell reselection based on slice-related information, wherein the slice-related information is received by an access stratum from a non-access stratum, and the slice-related information comprises a slice priority relation of multiple slices, wherein performing at least one of the cell selection or the reselection based on the slice-related information comprises:

determining a first frequency priority relation of multiple frequencies related with the multiple slices based on the slice priority relation; and performing the at least one of the cell selection or the cell reselection based on the first frequency priority relation and a second frequency priority relation received from a base station, comprising:

determining a target frequency priority relation based on the first frequency priority relation and the second frequency priority relation; and performing the at least one of the cell selection or the cell reselection based on the target frequency priority relation;

wherein determining the target frequency priority relation based on the first frequency priority relation and the second frequency priority relation comprises:

in a case where the second frequency priority relation is carried in a broadcast message of the base station, determining priorities of frequencies in the first frequency priority relation being higher than priorities of frequencies in the second frequency priority relation;

wherein determining the priorities of the frequencies in the first frequency priority relation being higher than the priorities of the frequencies in the second frequency priority relation comprises:

determining overlap frequencies between the frequencies in the first frequency priority relation and the frequencies in the second frequency priority relation; and determining priorities of the overlap frequencies based on the first frequency priority relation, and determining the priorities of the overlap frequencies being higher than the priorities of other frequencies in the second frequency priority relation.

2. The method of claim 1, wherein the slice-related information comprises at least one of requested network slice selection assistance information or allowed network slice selection assistance information.

3. The method of claim 2, wherein at least one of the requested network slice selection assistance information or the allowed network slice selection assistance information is provided to the access stratum by the non-access stratum in a case where the terminal sends an initial non-access stratum message.

4. The method of claim 2, wherein at least one of the requested network slice selection assistance information or the allowed network slice selection assistance information is provided to the access stratum by the non-access stratum in a case where the terminal sends a non-access stratum message so as to update registered slices.

5. The method of claim 1, wherein the slice-related information comprises pre-configured network slice selection assistance information provided by the non-access stratum to the access stratum when selecting a public land mobile network.

6. The method of claim 1, further comprising:

determining a third frequency priority relation of a frequency related with each slice;

wherein determining the first frequency priority relation based on the slice priority relation comprises:

for the frequency related with each slice, determining a priority of the frequency related with a high priority slice being higher than a priority of the frequency related with a low priority slice; and determining a priority of the frequency related with the slice based on the third frequency priority relation.

7. The method of claim 6, further comprising:

in a case of a conflict between the slice priority relation determined based on a policy of the terminal and the slice priority relation determined based on a priority of applications in the terminal indicated by a first non-access stratum message, selecting the slice priority relation determined based on the policy of the terminal or the slice priority relation determined based on the priority of applications in the terminal indicated by the first non-access stratum message based on a second non-access stratum message.

8. The method of claim 1, wherein the slice priority relation is determined based on at least one of a policy of the terminal or a priority of applications in the terminal indicated by a first non-access stratum message.

9. The method of claim 1, wherein determining the target frequency priority relation based on the first frequency priority relation and the second frequency priority relation comprises:

in a case where the second frequency priority relation is carried in a first dedicated signaling sent by the base station to the terminal, determining the priorities of the frequencies in the first frequency priority relation being higher than the priorities of the frequencies in the second frequency priority relation.

10. The method of claim 1, wherein determining the target frequency priority relation based on the first frequency priority relation and the second frequency priority relation comprises:

in a case where the second frequency priority relation is carried in a first dedicated signaling sent by the base station to the terminal, determining the priorities of the frequencies in the second frequency priority relation being higher than the priorities of the frequencies in the first frequency priority relation.

11. The method of claim 1, wherein determining the target frequency priority relation based on the first frequency priority relation and the second frequency priority relation comprises:

in a case where the second frequency priority relation is carried in a first dedicated signaling sent by the base station to the terminal, determining the priorities of the frequencies in the first frequency priority relation being higher than the priorities of the frequencies in the second frequency priority relation, or determining the priorities of the frequencies in the second frequency priority relation being higher than the priorities of the frequencies in the first frequency priority relation based on a second dedicated signaling sent by the base station to the terminal.

12. An electronic device being a terminal, comprising:

a processor; and a memory for storing instructions executable by the processor;

wherein the processor is configured to:

perform at least one of a cell selection or a cell reselection based on slice-related information, wherein the slice-related information is received by an access stratum from a non-access stratum, and the slice-related information comprises a slice priority relation of multiple slices, and the processor is configured to perform at least one of the cell selection or the reselection based on the slice-related information by:

determining a first frequency priority relation of multiple frequencies related with the multiple slices based on the slice priority relation; and performing at least one of the cell selection or the cell reselection based on the first frequency priority relation and a second frequency priority relation received from a base station, comprising:

determining a target frequency priority relation based on the first frequency priority relation and the second frequency priority relation; and performing the at least one of the cell selection or the cell reselection based on the target frequency priority relation;

wherein determining the target frequency priority relation based on the first frequency priority relation and the second frequency priority relation comprises:

in a case where the second frequency priority relation is carried in a broadcast message of the base station, determining priorities of frequencies in the first frequency priority relation being higher than priorities of frequencies in the second frequency priority relation;

wherein determining the priorities of the frequencies in the first frequency priority relation being higher than the priorities of the frequencies in the second frequency priority relation comprises:

determining overlap frequencies between the frequencies in the first frequency priority relation and the frequencies in the second frequency priority relation; and determining priorities of the overlap frequencies based on the first frequency priority relation, and determining the priorities of the overlap frequencies being higher than the priorities of other frequencies in the second frequency priority relation.

13. The electronic device of claim 12, wherein the slice-related information comprises at least one of requested network slice selection assistance information or allowed network slice selection assistance information.

14. The electronic device of claim 12, wherein the slice-related information comprises pre-configured network slice selection assistance information provided by the non-access stratum to the access stratum in a case of selecting a public land mobile network.

15. The electronic device of claim 12, wherein the processor is further configured to:

determine a third frequency priority relation of a frequency related with each slice; wherein in determining the first frequency priority relation based on the slice priority relation, the processor is configured to:

for the frequency related with each slice, determine a priority of the frequency related with a high priority slice being higher than a priority of the frequency related with a low priority slice; and determine a priority of the frequency related with the slice based on the third frequency priority relation.

16. The electronic device of claim 15, wherein the processor is further configured to:

in a case of a conflict between the slice priority relation determined based on a policy of the terminal and the slice priority relation determined based on a priority of applications in the terminal indicated by a first non-access stratum message, select the slice priority relation determined based on the policy of the terminal or the slice priority relation determined based on the priority of applications in the terminal indicated by the first non-access stratum message based on a second non-access stratum message.

17. The electronic device of claim 12, wherein the slice priority relation is determined based on at least one of a policy of the terminal or a priority of applications in the terminal indicated by a first non-access stratum message.

18. The electronic device of claim 12, wherein in determining the target frequency priority relation based on the first frequency priority relation and the second frequency priority relation, the processor is further configured to:

in a case where the second frequency priority relation is carried in a first dedicated signaling sent by the base station to the terminal, determine the priorities of the frequencies in the first frequency priority relation being higher than the priorities of the frequencies in the second frequency priority relation.

19. The electronic device of claim 12, wherein in determining the target frequency priority relation based on the first frequency priority relation and the second frequency priority relation, the processor is further configured to:

in a case where the second frequency priority relation is carried in a first dedicated signaling sent by the base station to the terminal, determine the priorities of the frequencies in the second frequency priority relation being higher than the priorities of the frequencies in the first frequency priority relation.

20. A communication system, comprising a terminal and a base station, wherein the terminal communicates with the base station, and is configured to:

perform at least one of a cell selection or a cell reselection based on slice-related information, wherein the slice-related information is received by an access stratum from a non-access stratum, and the slice-related information comprises a slice priority relation of multiple slices;

wherein the terminal is configured to perform at least one of the cell selection or the reselection based on the slice-related information by:

determining a first frequency priority relation of multiple frequencies related with the multiple slices based on the slice priority relation; and performing at least one of the cell selection or the cell reselection based on the first frequency priority relation and a second frequency priority relation received from a base station, comprising:

determining a target frequency priority relation based on the first frequency priority relation and the second frequency priority relation; and performing the at least one of the cell selection or the cell reselection based on the target frequency priority relation;

wherein determining the target frequency priority relation based on the first frequency priority relation and the second frequency priority relation comprises:

in a case where the second frequency priority relation is carried in a broadcast message of the base station, determining priorities of frequencies in the first frequency priority relation being higher than priorities of frequencies in the second frequency priority relation;

wherein determining the priorities of the frequencies in the first frequency priority relation being higher than the priorities of the frequencies in the second frequency priority relation comprises:

determining overlap frequencies between the frequencies in the first frequency priority relation and the frequencies in the second frequency priority relation; and determining priorities of the overlap frequencies based on the first frequency priority relation, and determining the priorities of the overlap frequencies being higher than the priorities of other frequencies in the second frequency priority relation.

* * * * *